(12) United States Patent
Lovell et al.

(10) Patent No.: US 9,677,578 B2
(45) Date of Patent: Jun. 13, 2017

(54) VOLUME BOOSTER WITH STABILIZED TRIM

(71) Applicant: FISHER CONTROLS INTERNATIONAL LLC, Marshalltown, IA (US)

(72) Inventors: Michel K. Lovell, Marshalltown, IA (US); Ryan J. Jwanouskos, Marshalltown, IA (US); Gary L. Scott, Marshalltown, IA (US); Kenneth W. Junk, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 101 days.

(21) Appl. No.: 14/031,266

(22) Filed: Sep. 19, 2013

(65) Prior Publication Data

US 2014/0026746 A1 Jan. 30, 2014

Related U.S. Application Data

(62) Division of application No. 12/882,549, filed on Sep. 15, 2010, now Pat. No. 8,631,826.

(51) Int. Cl.
*F15B 13/04* (2006.01)
*F15B 15/00* (2006.01)
(Continued)

(52) U.S. Cl.
CPC .......... *F15B 15/00* (2013.01); *F15B 13/0405* (2013.01); *F16K 11/04* (2013.01);
(Continued)

(58) Field of Classification Search
CPC    F15B 13/045; F15B 13/0433; F15B 13/0405; F15B 15/00; F16K 11/04;
(Continued)

(56) References Cited

U.S. PATENT DOCUMENTS

| 750,331 A | 1/1904 | Ackley |
| 2,459,456 A * | 1/1949 | Rockwell ................ 137/627.5 |

(Continued)

FOREIGN PATENT DOCUMENTS

| DE | 33 04 523 A1 | 8/1984 |
| DE | 202 11 249 U1 | 12/2003 |

(Continued)

OTHER PUBLICATIONS

International Preliminary Report on Patentability for Application No. PCT/US2012/061285, dated Apr. 22, 2014.

(Continued)

*Primary Examiner* — Craig J Price
(74) *Attorney, Agent, or Firm* — Marshall, Gerstein & Borun LLP

(57) ABSTRACT

A fluid flow control device includes a body having an inlet connection, an outlet connection, and a discharge port. A supply path extends between the inlet connection and the outlet connection and a booster module is disposed within the body. The booster module includes a control element and an actuator element and defines an exhaust path extending between the outlet connection and the discharge port. A supply port is disposed within the booster module along the supply path between the inlet connection and the outlet connection.

3 Claims, 7 Drawing Sheets

(51) Int. Cl.
  *F16K 11/04* (2006.01)
  *F16K 27/02* (2006.01)
  *F15B 13/043* (2006.01)
(52) U.S. Cl.
  CPC ...... *F16K 27/0263* (2013.01); *F15B 13/0433* (2013.01); *Y10T 137/8663* (2015.04); *Y10T 137/87193* (2015.04)
(58) Field of Classification Search
  CPC ................ F16K 47/08; F16K 27/0263; Y10T 137/2409; Y10T 137/86622; Y10T 137/86919; Y10T 137/8663; Y10T 137/87193; Y10T 137/87225
  USPC ...... 137/85, 596.18, 625.65, 625.66, 596.14, 137/625.25, 627.5, 204; 303/40; 91/273, 91/450, 463, 465; 251/50, 53, 55
  See application file for complete search history.

(56) References Cited

U.S. PATENT DOCUMENTS

| | | | | |
|---|---|---|---|---|
| 2,910,325 | A * | 10/1959 | Price et al. | 137/85 |
| 2,985,490 | A * | 5/1961 | Gates | 137/627.5 |
| 3,504,946 | A * | 4/1970 | Valentine et al. | 137/627.5 |
| 3,693,659 | A | 9/1972 | Parola | |
| 3,730,226 | A * | 5/1973 | Nelson | 137/627.5 |
| 3,736,960 | A * | 6/1973 | Cohen | 137/625.66 |
| 3,741,245 | A * | 6/1973 | West | 137/596.18 |
| 3,771,836 | A * | 11/1973 | Bueler | 303/40 |
| 3,788,350 | A * | 1/1974 | West | 137/596.18 |
| 3,800,817 | A | 4/1974 | Gropp et al. | |
| 3,907,379 | A * | 9/1975 | Lawson | 137/627.5 |
| 4,037,879 | A * | 7/1977 | Horowitz | 137/627.5 |
| 4,096,884 | A * | 6/1978 | Horowitz | 137/627.5 |
| 4,117,865 | A * | 10/1978 | Beck | 137/627.5 |
| 4,193,643 | A * | 3/1980 | Knight | 303/40 |
| 4,264,108 | A * | 4/1981 | Bordoni | 303/40 |
| 4,455,051 | A * | 6/1984 | Falk | 303/28 |
| 4,505,865 | A | 3/1985 | Wullenkord | |
| 4,561,464 | A * | 12/1985 | Frantz | 137/627.5 |
| 4,617,963 | A | 10/1986 | Stares | |
| 4,640,309 | A * | 2/1987 | Hoffman et al. | 137/596.14 |
| 4,718,486 | A * | 1/1988 | Black | E21B 19/22 166/265 |
| 4,725,101 | A * | 2/1988 | Szudy et al. | 303/40 |
| 4,794,950 | A * | 1/1989 | Gratzmuller | 137/596.18 |
| 4,856,851 | A * | 8/1989 | Herring et al. | 303/40 |
| 4,979,537 | A * | 12/1990 | Offenwanger | 137/627.5 |
| 5,067,519 | A * | 11/1991 | Russell et al. | 137/596.14 |
| 5,261,458 | A * | 11/1993 | Johnson et al. | 137/627.5 |
| 5,682,918 | A * | 11/1997 | Stoll et al. | 137/627.5 |
| 5,709,246 | A * | 1/1998 | Koelzer | 137/627.5 |
| 5,762,094 | A * | 6/1998 | Hendershot et al. | 137/627.5 |
| 5,897,174 | A * | 4/1999 | Ehrlich | 137/627.5 |
| 6,668,848 | B2 * | 12/2003 | Lafler et al. | 137/863 |
| 6,935,107 | B2 * | 8/2005 | Tondolo | 60/417 |
| 7,147,006 | B2 * | 12/2006 | Shaw et al. | 137/627.5 |
| 7,458,310 | B2 | 12/2008 | Junk | |
| 7,845,268 | B2 | 12/2010 | Junk | |
| 9,222,490 | B2 * | 12/2015 | Fishwick | F15B 13/0405 |
| 2004/0182074 | A1 | 9/2004 | Steinke et al. | |
| 2005/0029416 | A1 | 2/2005 | Buck et al. | |
| 2005/0211321 | A1 | 9/2005 | Bush et al. | |
| 2005/0229775 | A1 | 10/2005 | Junk | |
| 2007/0240774 | A1 | 10/2007 | McCarty | |
| 2009/0097994 | A1 * | 4/2009 | Beck et al. | 417/411 |
| 2009/0283160 | A1 | 11/2009 | Fishwick et al. | |
| 2010/0207045 | A1 | 8/2010 | Koch et al. | |

FOREIGN PATENT DOCUMENTS

| | | |
|---|---|---|
| WO | WO-2004/072475 A2 | 8/2004 |
| WO | WO-2005/103542 A1 | 11/2005 |
| WO | WO-2005/106256 A1 | 11/2005 |

OTHER PUBLICATIONS

International Search Report and Written Opinion for Application No. PCT/US2011/051412, dated Feb. 10, 2012.
"Fairchild Model 4800A Pneumatic Volume Booster: Installation, Operation and Maintenance Instructions," understood to be publicly available at least as early as Sep. 14, 2010.
"Valve Positioners and Volume Boosters, Series 61 Booster Relays, Introduction," understood to be publicly available at least as early as Sep. 14, 2010.
ControlAir Inc., Type 6000 Volume Booster: High Flow Capacity in a Rugged Casing, Retrieved from the Internet on Jul. 20, 2010, understood to be publicly available at least as early as Sep. 14, 2010. Available at URL: http://www.controlair.com/boost_relay/6000boost.html.
Fairchild Industrial Products Company, Pneumatic Volume Booster, Model 200, understood to be publicly available at least as early as Sep. 14, 2010.
Fairchild Industrial Products Company, Pneumatic Volume Booster, Model 4500A, understood to be publicly available at least as early as Sep. 14, 2010.
Fairchild Industrial Products Company, Pneumatic Volume Booster, Model 200XLR, understood to be publicly available at least as early as Sep. 14, 2010.
Young Tech c., Ltd., "Users Manual," Volume Booster Relays, understood to be publicly available at least as early as Sep. 14, 2010.
International Preliminary Report on Patentability for Application No. PCT/US2011/051406, dated Mar. 19, 2013.
International Preliminary Report on Patentability for Application No. PCT/US2011/051412, dated Mar. 19, 2013.
International Search Report for Application No. PCT/US2012/061285, dated Mar. 8, 2013.
Office Action for U.S. Appl. No. 12/901,018, dated Jul. 12, 2013.

* cited by examiner ure to the specification.

VOLUME BOOSTER WITH STABILIZED TRIM

CROSS-REFERENCE TO RELATED APPLICATION

This is a divisional of U.S. application Ser. No. 12/882,549, filed Sep. 15, 2010, the entire contents of which are incorporated herein by reference.

FIELD OF THE DISCLOSURE

The present disclosure relates to fluid flow control systems and, more particularly, to volume boosters for enhancing control valve performance in fluid flow control systems.

BACKGROUND

Systems for controlling the flow of fluids, such as compressed air, natural gas, oil, propane, or the like, are generally known in the art. These systems often include at least one control valve for controlling various flow parameters of the fluid. Typical control valves include a control element such as a valve plug, for example, movably disposed within the flow path for controlling the flow of the fluid. The position of such a control element can be controlled by a positioner via a pneumatic actuator such as a piston actuator or a diaphragm-based actuator, as is known in the art. Conventional positioners deliver pneumatic signals via supply fluid to the actuator to stroke the control element of the control valve between an open and closed position, for example. The speed at which a the control valve can stroke partly depends on the size of the actuator and the flow of supply fluid contained in the pneumatic signal. For example, larger actuators/control valves typically take longer to be stroked when a positioner of equal flow output is used.

Therefore, such systems additionally employ one or more volume boosters located between the positioner and the actuator. The volume boosters are used to amplify the volume of supply fluid in relation to the pneumatic signal sent from the positioner, thereby increasing the speed at which the actuator strokes the control element of the control valve. Specifically, it should be understood by one of ordinary skill in the art that the volume booster is connected between the fluid supply and the valve actuator. Employing a pneumatic restriction in the volume booster allows large input signal changes to register on the booster input diaphragm sooner than in the actuator. A large, sudden change in the input signal causes a pressure differential to exist between the input signal and the output of the booster. When this occurs, the booster diaphragm moves to open either a supply port or an exhaust port, whichever action is required to reduce the pressure differential. The port remains open until the difference between the booster input and output pressures returns to within predetermined limits of the booster. A booster adjustment device may be set to provide for stable operation; (i.e. signals having small magnitude and rate changes pass through the volume booster and into the actuator without initiating booster operation).

However, conventional booster trim is susceptible to flow induced vibration. This vibration destabilizes the booster and often results in an audible "honking" noise being emitted from the booster. Typically this occurs at low lifts when the plug is near the seat and the vibration may occur in three-dimensional axes. This instability can happen when the booster is supplying air or when the booster is exhausting air. Such vibration or instability degrades the accuracy with which the booster can deliver a desired flow rate and causes accelerated wear of the booster trim components. This unsteady flow rate results in a variable or changing actuator velocity, which is highly undesirable.

Additionally, there are numerous applications where high capacity volume boosters are required (i.e. systems requiring volume boosters providing at least a maximum flow capacity (Cv) of seven (7.0)). Such large capacity systems may be designed with multiple volume boosters. Additionally, to maintain the large Cv, large diameter tubing is required (i.e. tubing that is at least 1" in diameter).

Conventional volume boosters attach to the actuator via pipe components such as nipples, tees, and crosses. Control valve assemblies for large capacity systems may also use external brackets to mount the volume booster to the actuator. Such existing systems (i.e. systems that use pipe components are structural or mounting members) often require long lengths of tubing to connect the multiple volume boosters. In many applications, vibration is common. Thus, the number of boosters and the conventional connection methods make typical high flow capacity actuator assemblies susceptible to vibration induced failures resulting from the cyclic motion induced during operation. That is, large actuator applications, where multiple volume boosters and/or large Cv volume boosters are required, current state of the art mounting systems are insufficient to stabilize the volume boosters in seismically active applications (i.e. the mounting configuration is dependent on the structural integrity of the tubing and generally do not minimize the moment of the volume booster in relation to the actuator). That is, long tubing runs associated with multiple volume booster applications and conventional bracketing or mounting are very susceptible to the cyclic stresses produced by system vibration. Furthermore, in applications where high flow capacity is required traditional large diameter tubing is heavy and difficult to bend to make efficient connections leading to long tubing runs and further subjecting traditional mounting brackets to vibration induced failures as well.

SUMMARY

One embodiment of the present disclosure provides a fluid flow control device, comprising a body comprising an inlet connection, an outlet connection, and a discharge port; a supply path extending between the inlet connection and the outlet connection; a booster module disposed within the body comprising a control element and an actuator element and defining an exhaust path extending between the outlet connection and the discharge port and a supply port disposed within the booster module along the supply path between the inlet connection and the outlet connection; and at least a first damping means operatively connected to the booster module.

In one embodiment, the fluid flow control device further comprises a second damping means operatively coupled to the booster module.

In one embodiment, the first damping means is comprised of at least one of a first elastomeric ring or a first dashpot.

In one embodiment, the second damping means is comprised of at least one of a second elastomeric ring or a second dashpot.

In one embodiment, the first damping means is affixed to the actuation element by an attachment device.

In one embodiment, the actuation element comprises a diaphragm assembly defining an exhaust port disposed along the exhaust path between the outlet port and the discharge port, the diaphragm assembly adapted for displacement between a closed position, wherein the exhaust port is in sealing engagement with the exhaust plug of the control element to close the exhaust path, and an open position, wherein the exhaust port is spaced from the exhaust plug of the control element to open the exhaust path, wherein the control element comprises a stem, a supply plug, and an exhaust plug, the control element adapted for displacement between a closed position, wherein the supply plug is in sealing engagement with the supply port to close the supply path, and an open position, wherein the supply plug is spaced from the supply port to open the supply path, the stem of the control element including a central portion extending between the supply and exhaust plugs and a guide portion extending away from the supply plug in a direction opposite the exhaust plug, the guide portion of the stem slidably disposed within a guide bore carried by the body, the guide bore being vented to an inlet chamber of the body, the inlet chamber being defined between the inlet port and the supply port.

In one embodiment, the biasing assembly is disposed between the diaphragm assembly and the body, the biasing assembly comprising a seating cup and a spring, the seating cup slidably disposed within a seating bore defined in the body providing an annular space about the seating cup, and the spring disposed in the seating cup and biasing the seating cup and the diaphragm assembly away from the body.

In one embodiment, the supply trim component threadably connected to the body at a location opposite the control member from the diaphragm assembly, the supply trim component defining a blind bore that constitutes the guide bore slidably receiving the guide portion of the stem of the control element.

In one embodiment, the first elastomeric ring is disposed between the seating cup and the seating bore.

In one embodiment, the seating bore is vented to a signal chamber that is disposed between the diaphragm assembly and the body via the annular space and wherein the seating cup defines at least one opening defining the vent between the seating bore and the signal chamber.

In one embodiment, the seating cup includes a bottom wall and a sidewall, wherein the at least one opening is defined through the sidewall.

In one embodiment, the at least one opening is defined through the sidewall of the seating cup at a location between the bottom wall of the seating cup and the second elastomeric ring.

In one embodiment, the first elastomeric ring disposed between the guide portion of the stem and the guide bore;

In one embodiment, the supply trim component threadably connected to the body at a location opposite the control member from the diaphragm assembly, the supply trim component defining a blind bore that constitutes the guide bore slidably receiving the guide portion of the stem of the control element.

In one embodiment, the supply trim component includes at least one opening defining the vent between the guide bore and the inlet chamber of the body and the at least one opening in the supply trim component communicates with the blind bore at a location that is opposite the first elastomeric ring from the supply plug of the control element.

In one embodiment, the body comprising an inlet connection, an outlet connection, and a discharge port. A supply path extending between the inlet connection and the outlet connection. A booster module disposed within the body comprising a control element and an actuator element and defining an exhaust path extending between the outlet connection and the discharge port and a supply port disposed within the booster module along the supply path between the inlet connection and the outlet connection, the booster module operating from a quiescent state having the supply and exhaust paths substantially closed.

In one embodiment, the fluid flow control device comprises at least a first damping means operatively connected to the booster module.

In one embodiment, the fluid flow control device further comprises a second damping means operatively coupled to the booster module.

In one embodiment, the first damping means is comprised of at least one of a first elastomeric ring or a first dashpot.

In one embodiment, the second damping means is comprised of at least one of a second elastomeric ring or a second dashpot.

In one embodiment, the first damping means is affixed to the actuation element by an attachment device.

In one embodiment, the actuation element comprises a diaphragm assembly defining an exhaust port disposed along the exhaust path between the outlet port and the discharge port, the diaphragm assembly adapted for displacement between a closed position, wherein the exhaust port is in sealing engagement with the exhaust plug of the control element to close the exhaust path, and an open position, wherein the exhaust port is spaced from the exhaust plug of the control element to open the exhaust path, wherein the control element comprises a stem, a supply plug, and an exhaust plug, the control element adapted for displacement between a closed position, wherein the supply plug is in sealing engagement with the supply port to close the supply path, and an open position, wherein the supply plug is spaced from the supply port to open the supply path, the stem of the control element including a central portion extending between the supply and exhaust plugs and a guide portion extending away from the supply plug in a direction opposite the exhaust plug, the guide portion of the stem slidably disposed within a guide bore carried by the body, the guide bore being vented to an inlet chamber of the body, the inlet chamber being defined between the inlet port and the supply port.

In one embodiment, the fluid actuator; a positioner; a volume booster; the volume booster having a plurality of mounting surfaces in a generally rectangular arrangement about a longitudinal axis Z adapted to operatively couple the volume booster to the actuator.

In one embodiment, the plurality of mounting surfaces defines a cube-shaped volume on a lower portion of the volume booster.

In one embodiment, the mounting plate is adapted to slidably attach the volume booster to the actuator.

In one embodiment, the mounting plate substantially reduces the coupling moment of the volume booster to the actuator.

In one embodiment, the tubing guide is operatively connected to at least one of the plurality of mounting surfaces.

DETAILED DESCRIPTION

The examples, i.e., embodiments, described herein are not intended to be exhaustive or to limit the scope of the invention to the precise form or forms disclosed. Rather, the following description has been chosen to provide examples of the one or more preferred embodiments to those having ordinary skill in the art.

Figure 1:
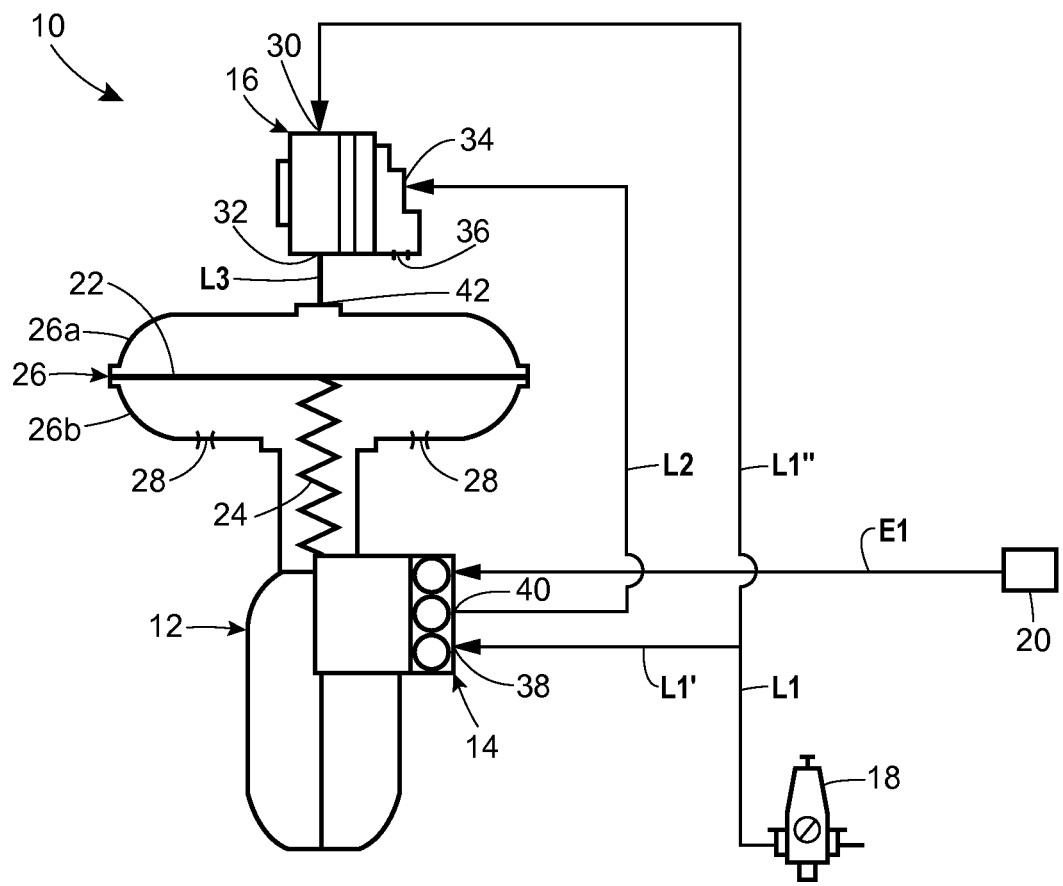
FIG. 1 is a schematic representation of a single-acting spring and diaphragm actuator assembly including a volume booster constructed in accordance with the principles of the present disclosure.

FIG. 1 provides a schematic representation of a single-acting spring and diaphragm actuator assembly 10 constructed in accordance with the principles of the present disclosure. Specifically, the actuator assembly 10 comprises an actuator 12, a positioner 14, and a volume booster 16. In the disclosed embodiment, the actuator assembly 10 is also illustrated as being fluidly coupled to a regulator 18. The actuator 12 is adapted to be operably connected to a control valve (not shown) equipped with a movable control element for controlling the flow of a fluid through a system such as a fluid distribution or other fluid management system, for example.

Still referring to FIG. 1, the volume booster 16 includes an inlet connection 30, a outlet connection 32, a control connection 34, and a discharge port 36. The positioner 14 includes an inlet 38 and an outlet 40. The actuator 12 includes a actuator supply port 42. The actuator 12, the positioner 14, the volume booster 16, and the regulator 18 communicate with each other via a plurality of fluid lines. Specifically, the regulator 18 is in fluid communication with the positioner 14 and the volume booster 16 via a supply line L1, which is split into a first supply line L1' and a second supply line L1". The outlet 40 of the positioner 14 is in fluid communication with the control connection 34 of the volume booster 16 via an output signal line L2. The outlet connection 32 of the volume booster 16 is in fluid communication with the actuator supply port 42 of the actuator 12 via a control line L3.

As will be described in more detail, the first supply line L1' is adapted to deliver a supply pressure to the inlet 38 of the positioner 14 and the second supply line L1" is adapted to deliver a supply pressure to the inlet connection 30 of the volume booster 16. The supply pressure can be provided to the supply line L1 via the regulator 18 from a pressure source such as a compressor, for example. Additionally, the positioner 14 is adapted to deliver a pneumatic control signal to the volume booster 16 via the output signal line L2 for controlling the operation of the actuator 12.

For example, based on an electrical signal received from a controller 20 via an electrical connection E1, the positioner 14 transmits a pneumatic signal to the control connection 34 of the volume booster 16 via the output signal line L2. The pneumatic signal passes through the volume booster 16 to drive the actuator 12 to actuate the control valve (not shown). Typically, the positioner 14 is adapted to generate a pneumatic signal of a relatively modest flow. Therefore, depending on the size of the actuator 12 and/or the desired speed at which the actuator 12 is to stroke the control valve, the volume booster 16 can operate to amplify the pneumatic signal with additional fluid flow sourced from the supply line L1, as will be described.

In the embodiment depicted in FIG. 1, the actuator 12 includes a fail-up actuator comprising a diaphragm 22 and a spring 24 contained within a diaphragm casing 26. The diaphragm casing 26 is formed from an upper casing 26a and a lower casing 26b creating an upper cavity 25a and a lower cavity 25b about diaphragm 22, respectively. The spring 24 is disposed in the lower cavity 25b of the casing 26 and biases the diaphragm 22 upward. Therefore, when the positioner 14 sends a pneumatic signal to the volume booster 16 via the output signal line L2, pneumatic flow is introduced into the upper cavity 25a of the actuator 12, thereby moving the diaphragm 22 downward. This downward movement is then transferred into a corresponding movement of the control element of the associated control valve (not shown), as is understood within the art.

Preferably, the casing 26 includes one or more vents 28 such that fluid contained within the lower cavity 25b vents out of the casing 26 when the diaphragm 22 moves downward. Such venting facilitates the movement of the diaphragm 22 in either the upward or downward direction. To stroke the actuator 12 upward, the positioner 14 vents the pneumatic signal to the volume booster 16 such that the spring 24 moves the diaphragm 22 upward. As the diaphragm 22 moves upward, the pressure built up in the upper cavity 25a of the casing 26 exhausts to the atmosphere via the control line L3, the discharge port 36 of the volume booster 16 and vent 28 draws in air to the lower casing 26b This exhausting to the atmosphere facilitates the movement of the diaphragm 22 in the upward direction.

Figure 2:
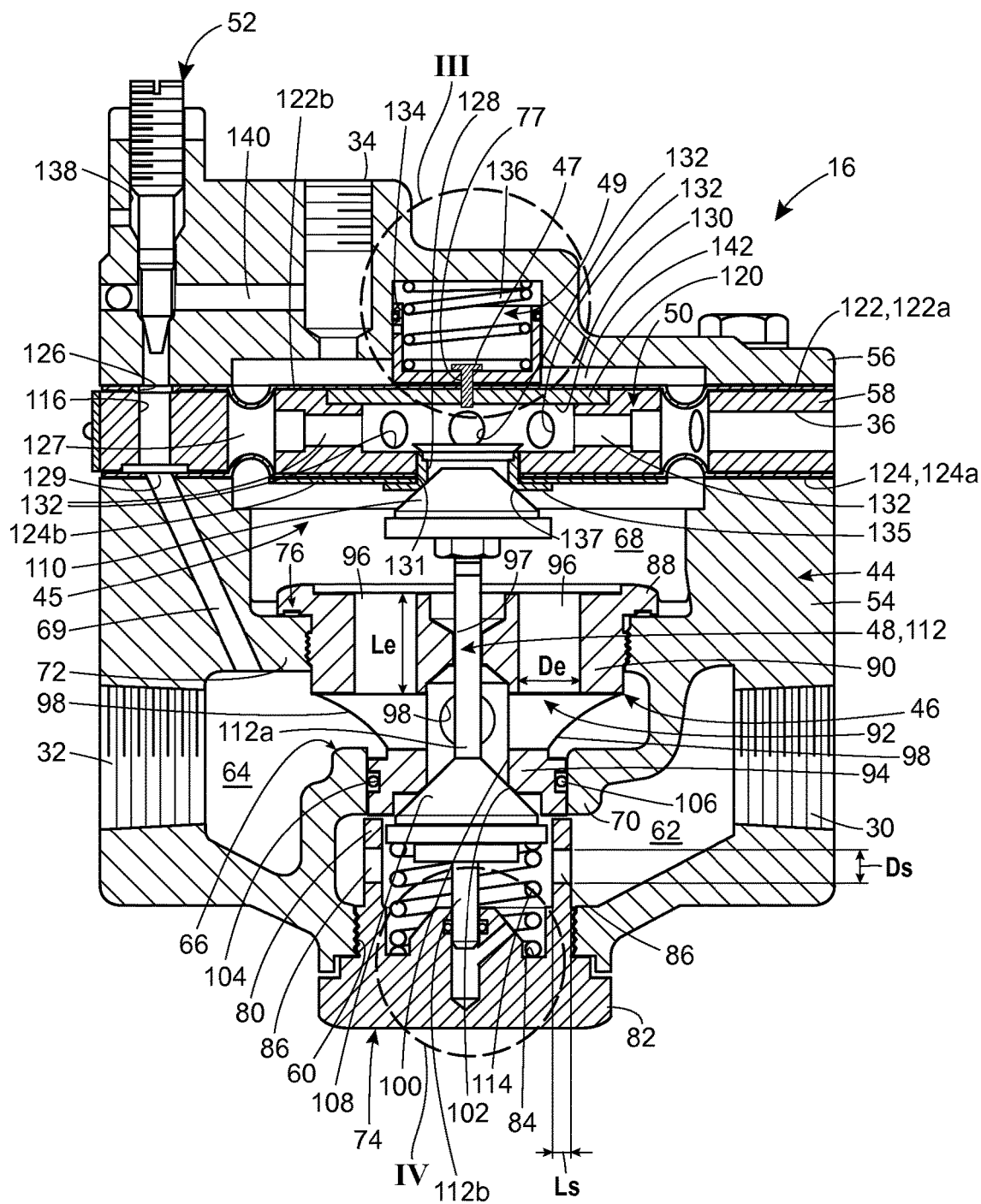
FIG. 2 is a side cross-sectional view of one embodiment of a volume booster constructed in accordance with the principles of the present disclosure.
Figure 3:
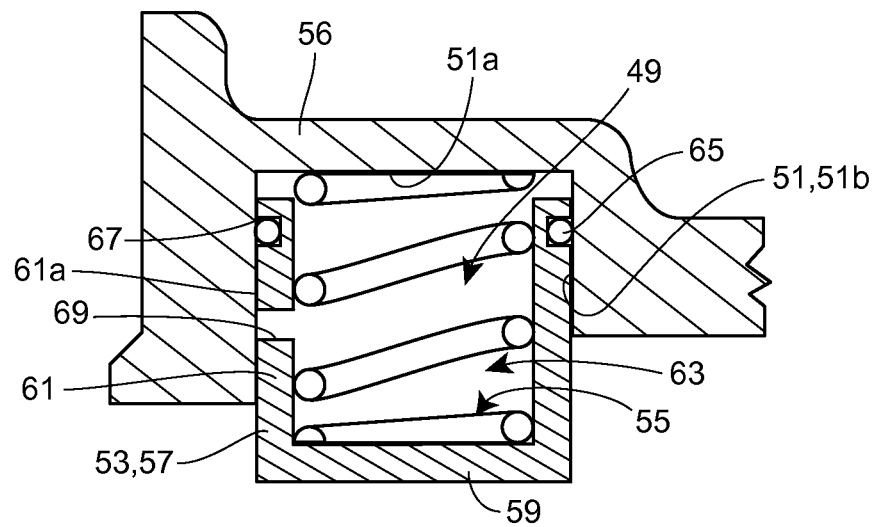
FIG. 3 is a detail view of the volume booster of FIG. 2 taken from circle III in FIG. 2.

With reference now to FIG. 2, one embodiment of the volume booster 16 depicted in FIG. 1 will be described. In general, the volume booster 16 includes a body 44, booster module 45 and a booster adjustment device 52. The body 44 generally includes a lower portion 54, a cap portion 56, and a spacer portion 58. The booster module 45 generally includes a trim assembly 46, a control element 48, a diaphragm assembly 50, and a biasing assembly 49. The lower portion 54 of the body 44 defines the inlet connection 30 and the outlet connection 32. Additionally, the lower portion 54 defines a supply trim opening 60, an inlet chamber 62, a outlet chamber 64, a intermediate region 66, an exhaust chamber 68, and a bypass passage 69. The intermediate region 66 is disposed between the inlet chamber 62 and the outlet chamber 64 and generally defines a cylindrical cavity including a lower web 70 and an upper web 72. The upper web 72 includes a threaded cylindrical opening receiving a corresponding portion of the trim assembly 46, as will be described. Similarly, the supply trim opening 60 includes a threaded cylindrical opening receiving a portion of the trim assembly 46. The cap portion 56 of the body 44 is disposed opposite the spacer portion 58 from the lower portion 54, thereby affixing the spacer portion 58 between the lower portion 54 and the cap portion 56, as illustrated. As shown in FIG. 3, the cap portion 56 defines, in part, a seating bore 51 slidably receiving at least a portion of the biasing assembly 49.

Figure 4:
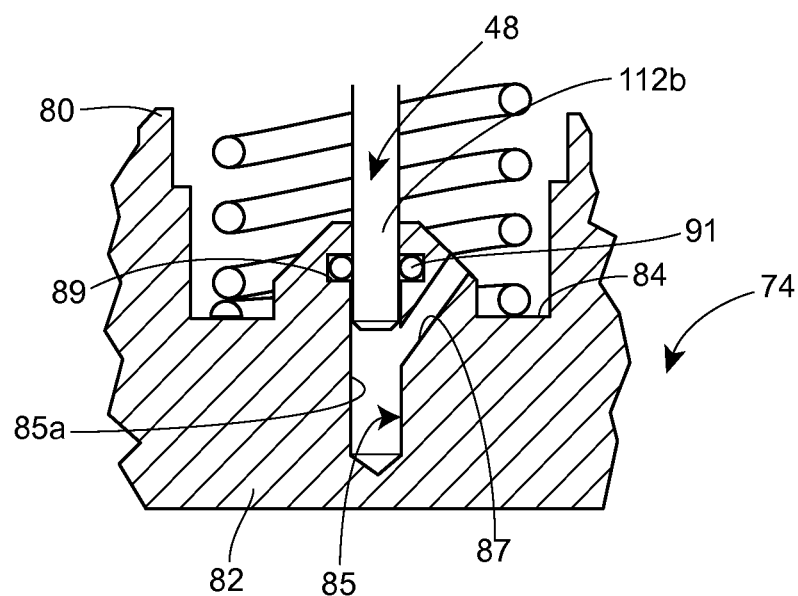
FIG. 4 is a detail view of the volume booster of FIG. 2 taken from circle IV in FIG. 2.

Referring back to FIG. 2, the trim assembly 46 includes a supply trim component 74 and an exhaust trim component 76. In the disclosed embodiment, the supply trim component 74 includes a cylindrical bushing removably threaded into the supply trim opening 60 of the lower portion 54 of the body 44 of the volume booster 16. In alternative embodiments, the supply trim component 74 could be formed as a single or unitary piece with the exhaust trim component 76 (as described in detail below) of the body 44 of the volume booster 16. As illustrated in FIG. 2, the supply trim component 74 includes a skirt portion 80, a hexagonal nut portion 82, and a spring seat 84. Additionally, as illustrated in FIG. 4, the supply trim component 74 includes a guide bore 85 having an first annular space 71. The guide bore 85 slidably receives a portion of the control element 48 within the first annular space 71 to guide the control element 48 and stabilize operation of the device.

With reference to FIG. 4, the guide bore 85 is vented to the supply chamber 62 via an opening 87 formed in the supply trim component 74. The opening 87, as illustrated, includes a through-bore extending and communicating between the guide bore 85 and the supply chamber 62 at an angle relative to a longitudinal axis of the guide bore 85. In other embodiments, the opening 85 could be configured differently. With continued reference to FIG. 4, the supply trim component 74 further defines a circumferential groove 89 formed in an inner sidewall 85a of the guide bore 85. The groove 89 accommodates an elastomeric ring 91, which can include a lubricated rubber o-ring, for example. As will be described further below, the opening 87 and the elastomeric ring 91 cooperate to stabilize operation of the volume booster 16 damping undesirable vibrations.

Referring back to FIG. 2, the skirt portion 80 includes a generally hollow cylindrical member extending from the hexagonal nut portion 82 into the supply chamber 62 of the lower portion 54 of the body 44. The skirt portion 80 defines a plurality of passages 86 extending radially therethrough. In the depicted embodiment, the passages 86 include cylindrical bores. Thus, the passages 86 extend along an axis that is generally perpendicular to an axis of the skirt portion 80. So configured, the skirt portion 80 of the supply trim component 74 restricts the flow of fluid through the body 44 from the supply chamber 62 to the outlet chamber 64 when the supply port is open (Not Shown). The exhaust trim component 76 includes a cylindrical bushing removably threaded into the cylindrical opening of the upper web 72 of the intermediate region 66 of the body 44. In other embodiments, the exhaust trim component 76 could be formed as one piece with the body 44. The exhaust trim component 76 also may include a hexagonal nut portion 88, a restrictor portion 90, a skirt portion 92, and a seating portion 94.

The hexagonal nut portion 88 of the exhaust trim component 76 is disposed within the exhaust chamber 68 of the body 44 and abutted against the upper web 72. The restrictor portion 90 includes a generally solid cylindrical member disposed within the cylindrical opening of the upper web 72 and defines a plurality of exhaust passages 96 and a control opening 97. In the depicted embodiment, the passages 96 in the restrictor portion 90 include cylindrical bores extending axially through the exhaust trim component 76. The skirt portion 92 extends from the restrictor portion 90 into the intermediate region 66 and defines a plurality of windows 98. So configured, the plurality of passages 96 in the restrictor portion 90 provides constant fluid communication between the outlet chamber 64 and the exhaust chamber 68, via the plurality of passages 96 in the restrictor portion 90.

The seating portion 94 of the exhaust trim component 76 includes a generally cylindrical member disposed within a cylindrical opening of the lower web 70 of the body 44. The seating portion 94 defines a central bore 100 and a valve seat 102. The central bore 100 is defined herein as a "supply port" of the volume booster 16. In the disclosed embodiment, the seating portion 94 also includes an external annular recess 104 receiving a seal 106 such as an o-ring. The seal 106 provides a fluid tight seal between the seating portion 94 of the exhaust trim component 76 and the lower web 70.

As illustrated in FIG. 2, the control element 48 of the disclosed embodiment of the volume booster 16 includes a control element 48 comprising a supply plug 108, an exhaust plug 110, and a stem 112. The stem 112 includes a central portion 112a and a guide portion 112b. The central portion 112a extends between and connects the supply plug 108 to the exhaust plug 110, and is slidably disposed in the control opening 97 of the restrictor portion 90 of the exhaust trim component 76. So configured, the exhaust plug 110 is disposed within the exhaust chamber 68 of the body 44, and the supply plug 108 is disposed within the supply chamber 62 of the body 44. More specifically, the supply plug 108 is disposed inside of the skirt portion 80 of the supply trim component 74 and is biased away from the supply trim component 74 by a spring 114. The spring 114 is seated against the spring seat 84 of the supply trim component 74. The spring 114 biases the supply plug 108 of the control element 48 into engagement with the valve seat 102 of the seating portion 94 of the exhaust trim component 76, thereby closing the "supply port" 100. In the disclosed embodiment, each of the supply and exhaust plugs 108, 110 includes a tapered cylindrical body defining a frustoconical seating surface. Other shapes of course could be implemented to satisfy the intended functions.

Referring to FIG. 4, the guide portion 112b of the stem 112 is slidably disposed in the guide bore 85 of the supply trim component 74 such that the elastomeric ring 91 is disposed between the guide portion 112b and the guide bore 85. So disposed, the elastomeric ring 91 creates friction between the guide portion 112b of the stem 112 and the guide bore 85 such as to eliminate the ability of small vibrations generated in the volume booster 16 to affect the axial position of the control element 48. Moreover, the elastomeric ring 91 can be radially compressed between the guide portion 112b of the stem 112 and the guide bore 85 such that the elastomeric ring 91 serves to center the guide portion 112b and eliminate vibrations generated in the volume booster 16, which can also affect the lateral position of the stem 112. A first or lower vent opening 87, which vents the guide bore 85, further assists with damping vibrations by providing an escape for any gas that may otherwise compress and expand inside of the guide bore 85, wherein uncontrolled compression and expansion due to vibrations in the system can exert unwanted forces on the stem 112.

That is, the first vent opening 87 and first annular space 71 create a restricted vent that functions as a first air spring or a dashpot to provide additional damping of the control element 48. The lower vent opening 87 and first annular space 71 form a predetermined fluid restriction between the guide bore 85 and the supply seat chamber 83. For example, a diameter of the lower vent opening 87 may be 0.035 inches and the diametric clearance of the first annular space 71 may be 0.024 inches. The predetermined fluid restriction creates a transition delay (i.e. establishes a time constant) for fluid being pumped between the guide bore 85 and the supply seat chamber 83. This transition delay creates the first air spring which may oppose vibrations induced in the control element 48. While the present embodiment of the supply trim component 74 has been described as including both the elastomeric ring 91 and the lower vent opening 87, alternative embodiments could include either the elastomeric ring 91 or the lower vent opening 87, as each serve to reduce the effect of vibrations on the position of the control element 48.

Referring back to FIG. 2 and as mentioned above, the spacer portion 58 of the body 44 of the volume booster 16 is positioned between the cap portion 56 and the lower portion 54. Generally, the spacer portion 58 includes an annular ring defining a radial through-bore, which comprises the discharge port 36 of the volume booster 16. Additionally, the spacer portion 58 defines an axial through-bore 116 in alignment with the bypass passage 69 of the lower portion 54 of the body 44. The discharge port 36 provides fluid communication between the exhaust chamber 68 of the lower portion 54 of the body 44 and the atmosphere, via the diaphragm assembly 50, as will be described.

The diaphragm assembly 50 comprises a floating manifold 120 positioned between first and second diaphragms 122, 124. The first diaphragm 122 includes a flexible diaphragm made from a known diaphragm material and includes a peripheral portion 122a and a central portion 122b. The peripheral portion 122a is compressed between the cap portion 56 and the spacer portion 58 of the body 44 of the volume booster 16. The peripheral portion 122a additionally defines an opening 126 in alignment with the axial through-bore 116 of the spacer portion 58. The second diaphragm 124 similarly includes a flexible diaphragm made from a known diaphragm material and includes a peripheral portion 124a and a central portion 124b. The peripheral portion 124a of the second diaphragm 124 is compressed between the spacer portion 58 and the lower portion 54 of the body 44. The peripheral portion 124a additionally defines an opening 129 in alignment with the axial through-bore 116 of the spacer portion 58. The central portion 124b further defines a central opening 131. The manifold 120 is disposed between the central portions 122b, 124b of the first and second diaphragms 122, 124 such that an annular passage 127 is defined between the manifold 120 and the spacer portion 58 of the body 44.

The manifold 120 comprises a disc-shaped member movably disposed inside of the spacer portion 58 of body 44. The manifold 120 defines an axial opening 128, an internal cavity 130, and a plurality of radial passages 132. The axial opening 128 is aligned with the central opening 131 in the second diaphragm 124 and is defined herein as an "exhaust port" of the volume booster 16. The axial opening 128 is equipped with a seating member 135 defining a valve seat 137. The axial opening 128 provides for fluid communication between the exhaust chamber 68 of the lower portion 54 of the body 44 and the internal cavity 130 of the manifold 120. The radial passages 132 provide for fluid communication between the internal cavity 130 of the manifold 120 and the annular passage 127 disposed between the manifold 120 and the spacer portion 58 of the body 44. The cap portion 56 of the body 44 of the volume booster 16 includes the control connection 34 and a threaded bore 138 connected by a fluid passage 140.

Additionally, the cap portion 56 defines a signal chamber 142 disposed above the diaphragm assembly 50 and in fluid communication with the control connection 34. The threaded bore 138 accommodates the booster adjustment device 52, which in one embodiment can include an adjustment screw. The booster adjustment device 52 can therefore be adjusted to adjust fluid flow from the control connection 34 to the outlet chamber 64. That is, the booster adjustment device 52 creates a pneumatic restriction between the control connection 34 and the outlet chamber 64. Because of the restriction, large input signal changes at the control connection 34 register on the diaphragm assembly 50 of the volume booster 16 sooner than on the diaphragm 22 of the actuator 12. For example, a large, sudden change in the input signal causes a pressure differential to exist between the control connection 34 and the outlet chamber 64 and activates the volume booster from a quiescent state. When this occurs, the diaphragm assembly 50 moves in opposition to the respective biasing element, as will be described later on, to open either the supply port or the exhaust port creating either a "inlet" state or an "exhaust" state in the volume booster 16, whichever action is required to reduce the pressure differential.

As is also depicted in FIG. 2 and as mentioned above, the present embodiment of the volume booster 16 includes the biasing assembly 49 disposed between the diaphragm assembly 50 and the cap portion 56 of the body 44. Generally, the biasing assembly 49 biases the diaphragm assembly 50 away from the cap portion 56 such that the valve seat 137 of the seating member 135 disposed in the axial opening 128 of the manifold 120 engages the exhaust plug 110 of the control element 46. This engagement closes the exhaust port 128.

With reference to FIG. 3, the biasing assembly 49 includes a spring seat 53 and a spring 55. The spring seat 53 comprises a seating cup 57 including a bottom wall 59 and a sidewall 61 defining a cavity 63 therebetween. The bottom wall 59 further includes an attachment device 47, such as a rivet, to fixedly attach the seating cup 57 to the diaphragm assembly 50 via through-hole 77. In one embodiment, the sidewall 61 can be a cylindrical sidewall thereby defining a cylindrical cavity 63. The seating cup 57 is disposed between the cap portion 56 of the body 44 and the diaphragm assembly 50 such that the bottom wall 59 contacts a portion of the diaphragm assembly 50 and the sidewall 61 is slidably disposed in the seating bore 51 of the cap portion 56. The spring 55 includes a coil spring disposed in the cavity 63 of the seating cup 57 and in engagement with the bottom wall 59 of the seating cup 57 and a horizontal terminal end surface 51a of the seating bore 51 in the cap portion 56 of the body 44, as shown. So configured, the spring 55 biases the seating cup 57 and diaphragm assembly 50 away from the cap portion 56.

As also shown in FIG. 3, the biasing assembly 49 includes an elastomeric ring 65 disposed between the sidewall 61 of the seating cup 57 and an internal sidewall 51b of the seating bore 51 of the cap portion 56 of the body 44. More specifically, the sidewall 61 of the seating cup 57 defines a circumferential groove 67 in an outer surface 61a. The groove 67 retains the elastomeric ring 65 and can include a lubricated rubber o-ring. In other embodiments, the grove 67 can be formed in the sidewall 51a of the seating bore 51 for retaining the elastomeric ring 65. So configured, the elastomeric ring 65 provides friction between the seating cup 57 and the seating bore 51 to eliminate small amplitude vibrations generated by the diaphragm assembly 50 during operation.

Additionally, as is also illustrated in FIG. 3, the spring seat 53 defines a second or upper vent opening 69 in the sidewall 61 of the seating cup 57. The upper vent opening 69 communicates with the cavity 63 in the seating cup 57, and therefore, the seating bore 51 such as to provide a vent for the seating bore 51 that also communicates with the signal chamber 142 defined above the diaphragm assembly 50 via a second annular space 70 between the outer surface 61a of the sidewall 61 of the seating cup 57 and the internal sidewall 51b of the seating bore 51. The upper vent opening 69 and second annular space 70 create a restricted vent that functions as a second air spring or dashpot to provide additional damping of the control element 48, as described in detail below.

In the disclosed embodiment, the upper vent opening 69 is defined through the sidewall 61 of the seating cup 57 at a location between the bottom wall 59 and the groove 67, which retains the elastomeric ring 65. As such, the upper vent opening 69 can also be described as being defined through the sidewall of the seating cup 57 at a location between the bottom wall 59 and the elastomeric ring 65. As will be described, this configuration of the upper vent opening 69 works in conjunction with the elastomeric ring 65 to provide additional stabilization to the diaphragm assembly 50 by enabling any air that might otherwise be trapped in the cavity 63 to escape.

That is as similarly described above, the upper vent opening 69, in conjunction with the second annular space 70, form a predetermined fluid restriction between the cavity 63 and the signal chamber 142. For example, a diameter of the upper vent opening 69 may be 0.035 inches and the diametric clearance of the second annular space 70 may be 0.004 inches. The predetermined fluid restriction creates a transition delay (i.e. establishes a time constant) for fluid be pumped between the cavity 63 and the signal chamber 142. This transition delay creates a second air spring that may oppose the motion of the bias assembly thereby providing a damping force that resists such motion, which subsequently damps motion of diaphragm assembly 50 and, therefore, the control element 48.

It should further be appreciated that attachment device 47 fixedly connects the seating cup 57, and, therefore the second air spring, to the diaphragm assembly. The direct coupling of the second air spring to the diaphragm assembly substantially eliminates decoupling of the air spring and the diaphragm assembly 50 during vibration to improve damping during unstable operating conditions (i.e. a partial vacuum drawn within the cavity 63 may decouple the seating cup 57 from the diaphragm assembly 50). Further, the rigid connection between the seating cup 57 and the diaphragm assembly 50 provides guiding and additional directional stability of the diaphragm assembly 50 along a longitudinal axis defined by the control element 48 via the sidewall 61 of the seating cup 57 and the internal sidewall 51b of the seating bore 51.

While the present embodiment of the biasing assembly 49 includes both the elastomeric ring 65 and the upper vent opening 69 and second annular space 70 to provide stability to the diaphragm assembly 50, alternative embodiments may include only either the elastomeric ring 65 or the upper vent opening 69 and second annular space 70.

As described above, to actuate the actuator 12 in the downward direction, the positioner 14 sends a pneumatic signal to the volume booster 16. Depending on the flow of the pneumatic signal, the pneumatic signal either actuates the actuator 12 by itself, or the pneumatic signal activates the volume booster 16 which is supplemented by fluid supplied from the regulator 18.

For example, if the pneumatic signal is not sufficient to activate the volume booster 16, as will be described, the fluid travels from the control connection 34, through the fluid passage 140 in the cap portion 56, beyond the booster adjustment device 52, and to the outlet chamber 64 of the lower portion 54 of the body 44, via the axial through-bore 116 in the spacer portion 58, and the bypass passage 69 in the lower portion 54 of the body 44. From there, the fluid exits the body 44, via the outlet connection 32, and enters the actuator supply port 42 of the actuator 12 to move the diaphragm 22 in the downward direction.

While the pneumatic signal actuates the actuator 12, it is also provided to the signal chamber 142 defined by the cap portion 56 of the body 44. Additionally, a steady pneumatic supply is constantly provided to the supply chamber 62 of the lower portion 54 of the body 44 from the regulator 18 (shown in FIG. 1).

For the sake of description, a pressure differential across the volume booster 16 is defined as a pressure differential occurring across the diaphragm assembly 50, i.e., between the signal chamber 142 and the exhaust chamber 68. Because the exhaust chamber 68 is in continuous fluid communication with the output chamber 64 of the lower portion 54 of the body 44 (via the exhaust passages 96 in the exhaust trim component 76), it can also be said that a pressure differential across the volume booster 16 is defined as a pressure differential occurring between the signal chamber 142 and the output chamber 64.

If the pressure differential across the volume booster 16 is insubstantial, the booster remains in a quiescent or neutral state having the supply and exhaust plugs 108, 110 of the control element 48 remain in the substantially zero flow or closed positions, as depicted in FIG. 2, whereby each sealingly engages the valve seats 102, 137 of the respective supply and exhaust ports 100, 128. So disposed, the diaphragm assembly 50 stays in a static unloaded or neutral position. This position is also assisted by the spring 114 biasing the supply plug 108 into engagement with the supply port 100, and the spring 136 biasing the diaphragm assembly 50 into engagement with the exhaust plug 110. In contrast, a substantial pressure differential across the volume booster 16 is one that is great enough to affect the diaphragm assembly 50, whether up or down, to move the control element 48, relative to the orientation of the volume booster 16 depicted in FIG. 2.

When the controller 20 commands the positioner 14 to stroke the actuator 12 upward as depicted in FIGS. 1 and 2, the positioner 14 responds by modifying the pressure differential across the diaphragm assembly 50 to shift the volume booster 16 from its quiescent state. For example, the pneumatic signal transmitted to the volume booster 16 is decreased. This causes the pressure in the signal chamber 142 to decrease below the pressure in the outlet chamber 64. The diaphragm assembly 50 rises upward while the spring 114 biases the control element 48 upward such that the supply plug 108 seals against the valve seat 102 of the supply port 100, thereby keeping the supply path closed.

With the supply path closed, the control element 48 cannot move upward, but back pressure from the outlet chamber 64 moves the diaphragm assembly 50 further upward against the force of the spring 136. This moves the diaphragm assembly 50 away from the exhaust plug 110 of the control element 48 and opens the exhaust port 128 creating an "exhaust" state. With the exhaust port 128 open, the volume booster 16 defines an "exhaust path" between the outlet chamber 64 and the discharge port 36. That is, pressurized fluid in the outlet chamber 64 travels to the exhaust chamber 68 via the passages 96 in the exhaust trim component 76, then to the central cavity 130 of the manifold 120 via the exhaust port 128, through the radial passages 132 in the manifold 120, and out of the discharge port 36 to the atmosphere.

When the controller 20 commands the positioner 14 to stroke the actuator 12 downward, the positioner 14 responds by modifying the pressure differential across the diaphragm assembly 50 to shift the volume booster 16 from its quiescent state. For example, during operation, a positive pressure differential condition is achieved when pressure is substantially greater in the signal chamber 142 than in the exhaust chamber 68 such as when the positioner 14 delivers a high fluid flow to the control connection 34. This can occur when the controller 20 drives the positioner 14 to stroke the actuator 12 downward direction, as depicted in FIGS. 1 and 2. The high fluid flow forces the diaphragm assembly 50 downward, which moves the control element 48 downward, thereby keeping the exhaust plug 110 closed against the exhaust port 128 and moving the supply plug 108 away from the supply port 100.

Thus, the volume booster 16 operates in a "inlet" state and subsequently opens a "supply path," which provides fluid flow from the regulator 18 to the actuator 12 via the volume booster 16. Specifically, fluid from the regulator 18 flows into the supply chamber 62, then through the supply port 100 and the outlet chamber 64 to the actuator 12, via the outlet connection 32. Again, because the outlet chamber 64 is also in constant fluid communication with the exhaust chamber 68 via the exhaust passages 96 in the exhaust trim component 76, the pressure in the common camber 64 is also registered on the second diaphragm 124 of the diaphragm assembly 50.

When the volume booster 16 operates with either the supply path or the exhaust path open, a fluid is flowing through the device. Upon completion of the commanded action, such as upward or downward stroking, the volume booster 16 will return to its quiescent or neutral state having the supply and exhaust plugs 108, 110 of the control element 48 remain in the substantially zero flow or closed positions, as depicted in FIG. 2. However, during operation, the volume booster may rapidly and temporarily transition from a "inlet" state to an "exhaust" state. Such rapid changes in fluid flow often include pressure variations that can cause the various components of the volume booster 16 to undesirably vibrate. For example, as mentioned above, the fluid flow through the volume booster 16 can cause the position of the diaphragm assembly 50 and/or the control element 48 to undergo small fluctuations. These fluctuations in position can further result in the fluid flow generating an undesirable audible noise under certain operating conditions. As such, the presently disclosed volume booster 16 may be advantageously equipped with the elastomeric rings 65, 91 disposed around the seating cup 57 of the biasing assembly 49 and the guide portion 112b of the stem 112, respectively. These elastomeric rings 65, 91 both serve to align the respective components and damp the effects of vibrations in the system and stabilize the system.

Furthermore, the disclosed volume booster 16 may include a first or a second air spring comprised of an upper and a lower vent opening 69, 87, and a first and second annular clearance 70, 71 in the seating cup 57 of the biasing assembly 49 and the supply trim component 74, respectively. As described above, these first and second air springs provide a dashpot function to the seating bore 51 and the guide bore 85 to further damp the effects of vibrations in the volume booster 16. As such, the volume booster 16 disclosed herein advantageously damps the effects of vibrations on the diaphragm assembly 50 and/or the control element 48 to substantially reduce and/or eliminate undesirable audible noises during operation.

While the volume booster 16 described herein includes elastomeric rings and vent openings for the sliding arrangement of the biasing assembly 49 and the guide portion 112b of the stem 112, an alternative embodiment of the volume booster 16 may only include an elastomeric ring and/or vent opening for one of the biasing assembly 49 and the stem 112. For example, in one alternative embodiment, the volume booster 16 may include the elastomeric ring 65 and/or the opening 69 in the biasing assembly 49, but not the elastomeric ring 91 and/or the opening 87 in the supply trim component 74. Still further, another alternative embodiment could include the elastomeric ring 91 and/or the opening 87 in the supply trim component 74, but not the elastomeric ring 65 and the opening 69 in the biasing assembly 49. Any of the foregoing alternatives would reduce vibrations by providing at least some degree of damping to the volume booster 16 that would otherwise not be present.

Furthermore, while the seating cup 57 and supply trim component 74 have each been described as having one vent opening 69, 87, respectively, in alternative embodiments, these components could include more than one opening performing the venting function. Similarly, either or both of the biasing assembly 49 and the supply trim component 74 could include more than just the single elastomeric rings 67, 91 depicted in the figures.

Figure 5:
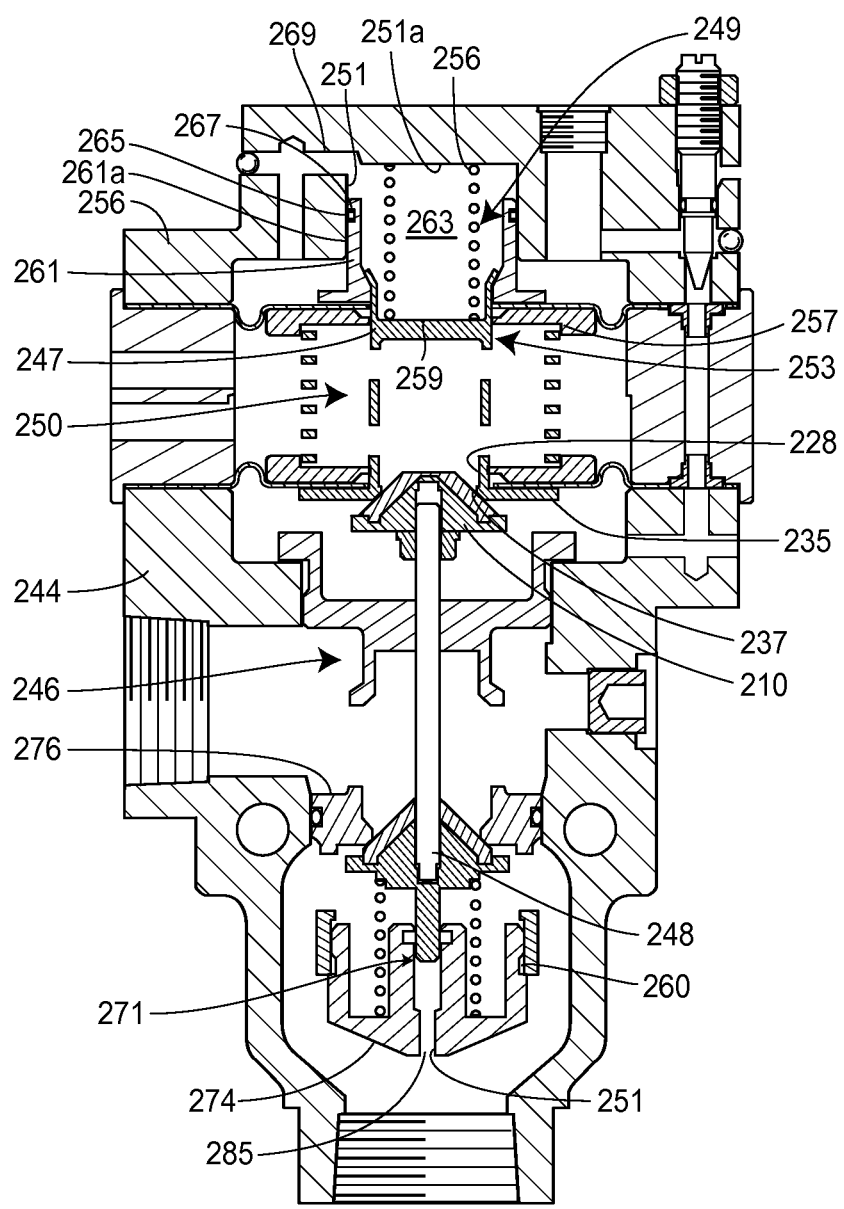
FIG. 5 is a detail view of a unitary booster module of a volume booster constructed in accordance with the principles of the present disclosure.

In another embodiment, referring to FIG. 5, the trim assembly 246 includes a unitary supply exhaust trim component 276. In the disclosed embodiment, the supply exhaust trim component 276 includes a cylindrical spring seat 274 removably threaded into the supply exhaust trim opening 260. Additionally, as illustrated in FIG. 5, the supply exhaust trim component 276 includes a guide bore 285 having an annular space 271. The guide bore 285 slidably receives a portion of the control element 248 within the annular space 271 to guide the control element 248 and stabilize operation of the device. The spring seat 274 preferably includes a through-hole 251 to eliminate any pneumatic resistance presented by the movement of the control element 248 within the guide bore 285. Additionally, an alternate embodiment for the upper air spring is illustrated.

As is also depicted in FIG. 5, a biasing assembly 249 is disposed between a diaphragm assembly 250 and a cap portion 256 of the body 244. Generally, the biasing assembly 249 biases the diaphragm assembly 250 away from the cap portion 256 such that the valve seat 237 of the seating member 235 disposed in the axial opening 228 engages the exhaust plug 210 of the control element 246. This engagement closes the exhaust port 228.

With reference to FIG. 5, the biasing assembly 249 includes a spring seat 253 and a spring 255. The spring seat 253 comprises a seating cup 257 including a bottom wall 259 and a sidewall 261 defining a cavity 263 therebetween. The seating cup 257 is fixedly attach to the diaphragm assembly 250. In one embodiment, the sidewall 261 can be a cylindrical sidewall thereby defining a cylindrical cavity 263. The seating cup 257 is disposed between the cap portion 256 of the body 244 and the diaphragm assembly 250 such that the bottom wall 259 contacts a portion of the diaphragm assembly 250 and the sidewall 261 is slidably disposed in the seating bore 251 of the cap portion 256. The spring 255 includes a coil spring disposed in the cavity 263 of the seating cup 257 and in engagement with the bottom wall 259 of the seating cup 257 and a horizontal terminal end surface 251a of the seating bore 251 in the cap portion 256 of the body 244, as shown. So configured, the spring 255 biases the seating cup 257 and diaphragm assembly 250 away from the cap portion 256.

As also shown in FIG. 5, the biasing assembly 249 includes an elastomeric ring 265 disposed between the sidewall 261 of the seating cup 257 and an internal sidewall 251b of the seating bore 251 of the cap portion 256 of the body 244. More specifically, the sidewall 261 of the seating cup 257 defines a circumferential groove 267 in an outer surface 261a. The groove 267 retains the elastomeric ring 265 and can include a lubricated rubber o-ring. In other embodiments, the grove 267 can be formed in the sidewall 251a of the seating bore 251 for retaining the elastomeric ring 265. So configured, the elastomeric ring 265 provides friction between the seating cup 257 and the seating bore 251 to eliminate small amplitude vibrations generated by the diaphragm assembly 250 during operation.

Additionally, as is also illustrated in FIG. 5, the seating bore 251 defines a second or upper vent opening 269 in the sidewall 261 of the seating bore 251. The upper vent opening 269 communicates with the cavity 263 in the seating cup 257 to provide a vent for the seating bore 251 above the diaphragm assembly 250. The upper vent opening 269 creates a restricted vent that functions as an air spring or dashpot to provide additional damping of the control element 248, as described in detail below.

In the disclosed embodiment, the upper vent opening 269 is defined through the sidewall 261 of the seating bore 251 at a location above the seating cup 257 and the groove 267, which retains the elastomeric ring 265. This configuration of the upper vent opening 269 works in conjunction with the elastomeric ring 265 to provide additional stabilization to the diaphragm assembly 250 by enabling any air that might otherwise be trapped in the cavity 263 to escape.

That is as similarly described above, the upper vent opening 269 forms a predetermined fluid restriction useful in stabilizing the volume booster. For example, a diameter of the upper vent opening 269 may be 0.035 inches. The predetermined fluid restriction creates a transition delay (i.e. establishes a time constant) for fluid be pumped between the cavity 263 and the signal chamber 142. This transition delay creates a second air spring that may oppose the motion of the bias assembly thereby providing a damping force that resists such motion, which subsequently damps motion of diaphragm assembly 250 and, therefore, the control element 248, which provides additional stability in the volume booster 216.

Figure 6A:
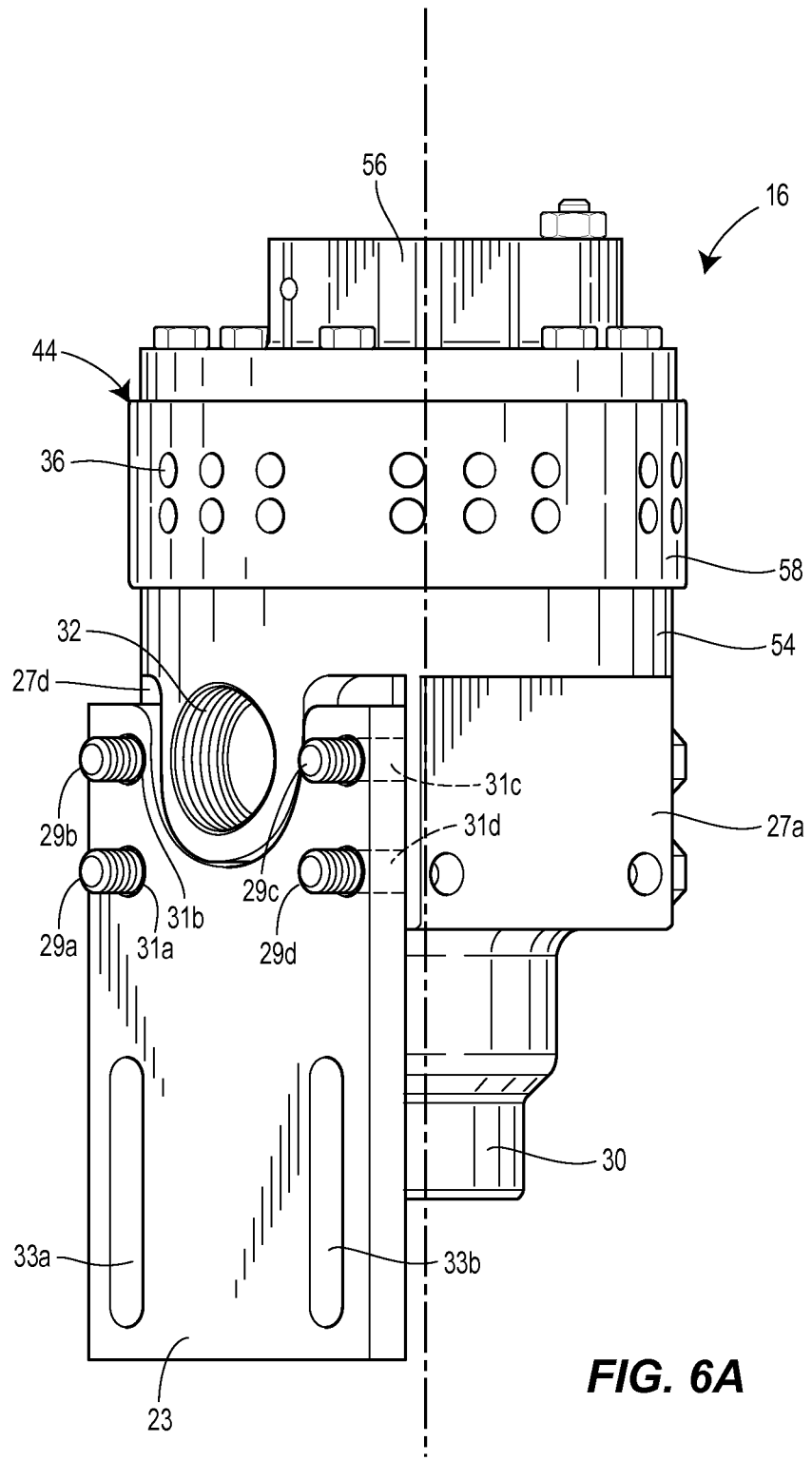
FIG. 6A is a perspective view of one embodiment of a volume booster constructed in accordance with the principles of the present disclosure.
Figure 6B:
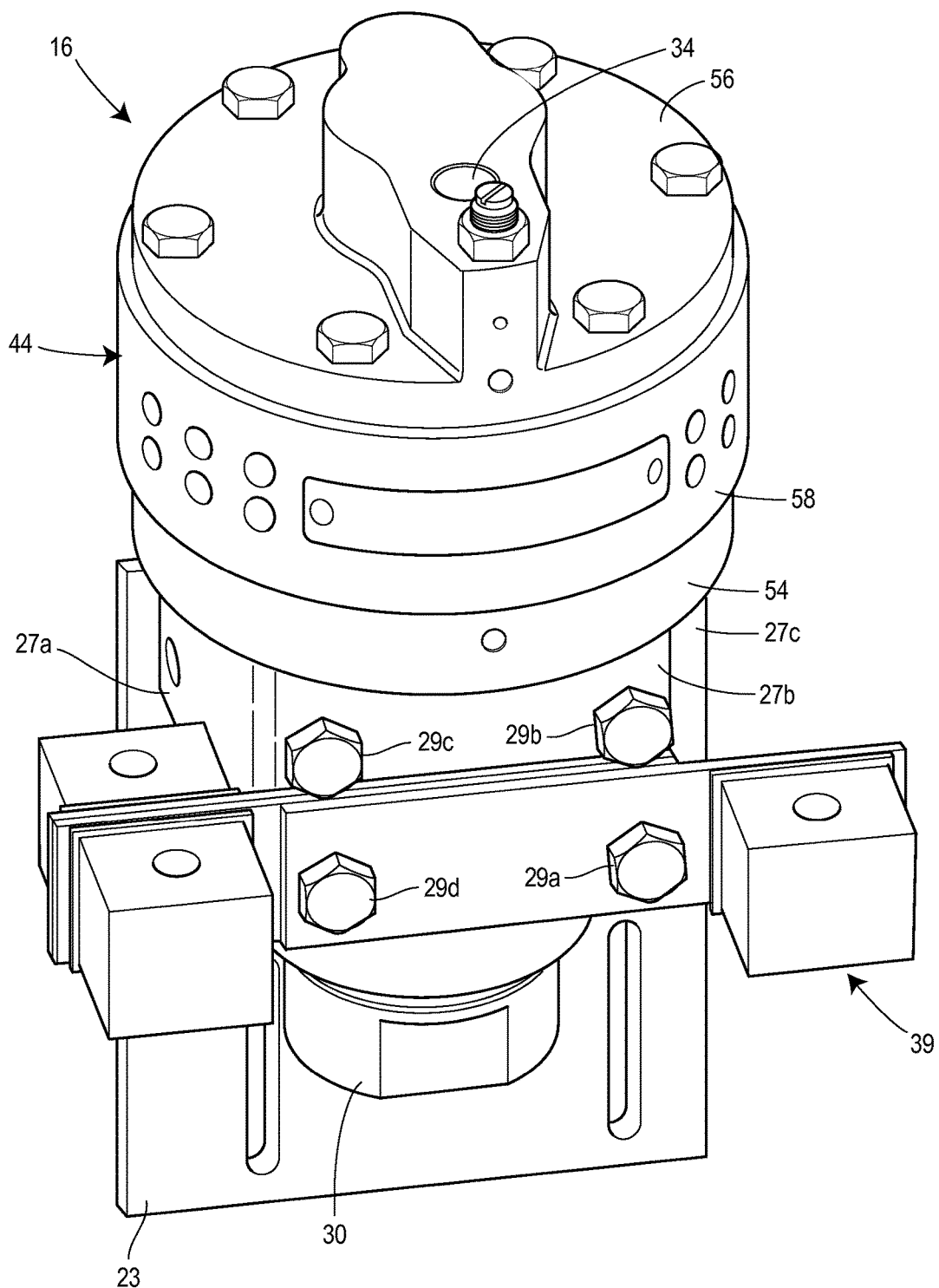
FIG. 6B is a perspective view of a volume booster constructed in accordance with the principles of the present disclosure.

With reference now to FIGS. 6A and 6B and as described above, the lower portion 54 of the volume booster 16 further includes a plurality of mounting surfaces 27a, 27b, 27c, 27d in a generally rectangular arrangement about a longitudinal axis Z, thereby defining a cube-shaped volume on the lower portion 54. The mounting surfaces 27a-d are adapted to operatively couple to a mounting plate 23 that may slidably attach the volume booster 16 to the actuator 12, as will be described in detail below. The lower portion 54 may include multiple through holes (not shown) to couple the volume booster 16 to the mounting plate 23. For example, the mounting plate 23 may include threaded holes 31a-31d to threadably attach the volume booster 16 to the mounting plate via fasteners 29a-d. As depicted in FIG. 6A, the mounting plate 23 may accommodate various mounting positions or alternate types of actuators via slotted holes 33a and 33b on the mounting plate 23. Specifically, the slotted holes 33a-b provide volume booster/actuator assembly such that the supply tubing can be close coupled with minimal bends to substantially reduce the length of tubing and reduce the coupling moment of the volume booster 16 to the actuator. Additionally, the mounting plate maybe of a variety of geometries such as square, rectangular, L-shaped, which may be dependent upon the type of actuator or the mounting location, as long as the mounting plate is adapted d the substantially reduce the coupling moment of the volume booster in relation to the actuator. It should be appreciated that the volume booster 16 may also directly attach to an actuator without the need to use a mounting plate, as previously described. For example, the actuator may include a mounting pad that permits the volume booster to be directly fastened or bolted to the actuator.

Further, as depicted in FIG. 6B, at least one of the mounting surfaces 27a-d may include a tubing mount 39 to guide and stabilize additional tubing, such as the instrument or control tubing. The tubing mount 39 may include a clamp or block arrangement to directly couple the control tubing to the actuator via the mounting surfaces 27a-d via throughholes. The embodiment depicted provides tubing connections that are substantially minimized in length. Such tubing arrangements reduce cost and enhance resistance to vibration induced failures and may be configured to guide a single tubes or multiple tubes adjacent to the volume booster 16.

Figure 7:
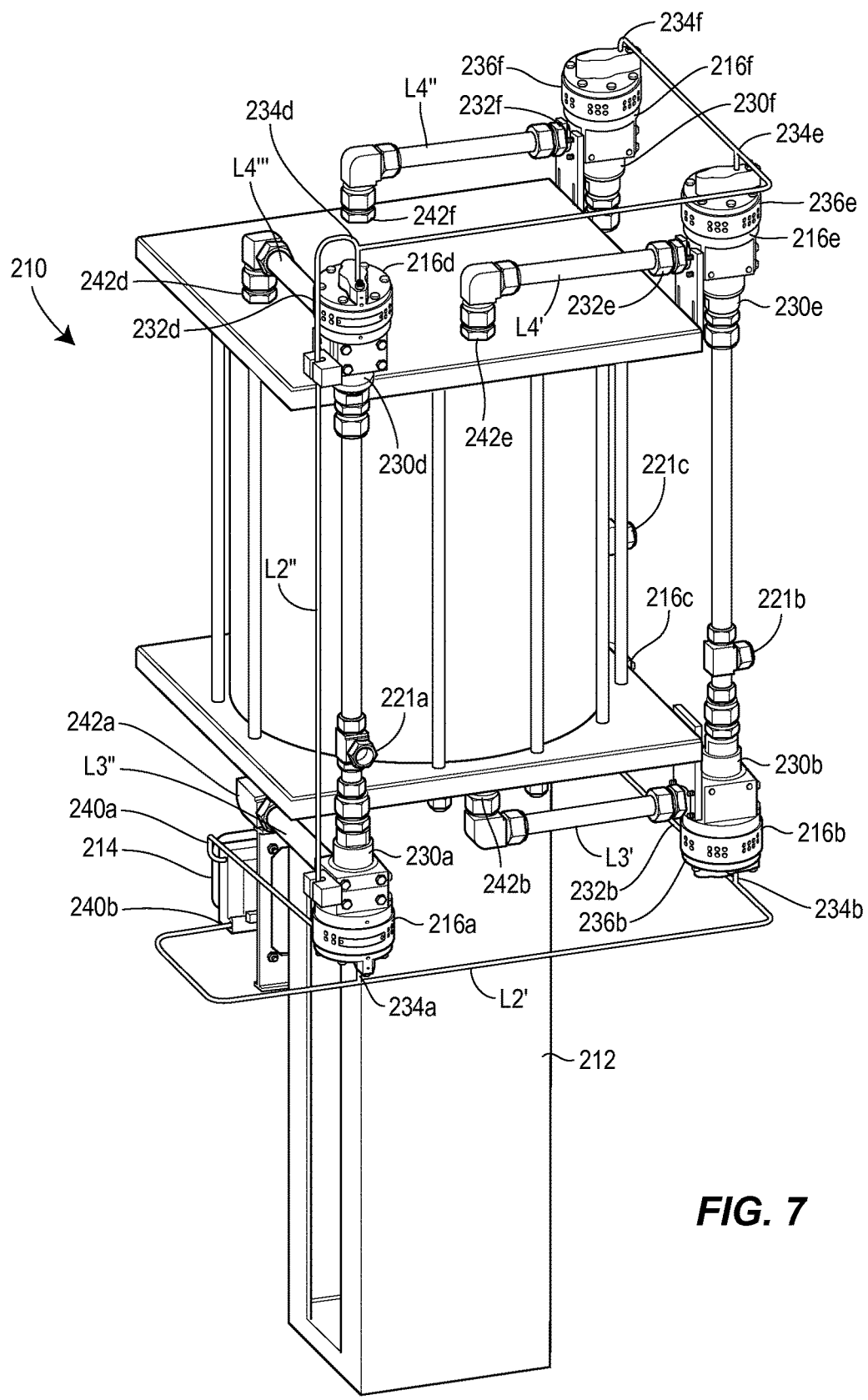
FIG. 7 is a schematic representation of a double-acting piston actuator assembly including multiple volume boosters constructed in accordance with the principles of the present disclosure.

Referring now to FIG. 7, a perspective view of a double-acting piston actuator assembly 210 constructed in accordance with the principles of the present disclosure is illustrated. Specifically, the actuator assembly 210 comprises an actuator 212, a positioner 214, and volume booster(s) 216a-f. The actuator 212 is adapted to be operatively coupled to a control valve (not shown) equipped with a movable control element for controlling the flow of a fluid through a system such as a fluid distribution or other fluid management system, for example. The multiple volume booster(s) 216a-f include corresponding inlet connections 230a, 230b, 230c (not shown), 230d, 230e, 230f, outlet connections 232a (not shown), 232b, 232c (not shown), 232d, 232e, 232f, control connections 234a, 234b, 234c (not shown), 234d, 234e, 234f, and discharge ports 236a (not shown), 236b, 236c (not shown), 236d, 236e, 236f. The positioner 214 includes a fluid supply inlet (not shown) and dual outputs 240a and 240b to drive the double-acting piston actuator 212 via the volume booster(s) 216 a-f. The actuator 212 includes lower actuator supply ports 242a, 242b, and 242c and upper actuator supply ports 242d, 242e and 242f to receive or exhaust a pneumatic signal for the volume booster(s) 216a-f. The actuator 212, the positioner 214, the volume boosters 116a-f communicate via a plurality of fluid lines. The outlets 240a-b of the positioner 214 are in fluid communication with the control connections 234a-f of the volume boosters 216a-f via an output signal lines L2' and L2". The outlet connections 232a-f of the volume boosters 216a-f are in fluid communication with the actuator supply ports 242a-f of the actuator 212 via the fluid output lines L3', L3", L3'" (not shown) and L4', L4", L4'". The volume booster(s) 216a-f may be coupled to the fluid supply via supply connections 221a, 221b, and 221c. As previously described, large valve applications require high capacity boosters, which in turn require large diameter tubing to maintain the large Cv. The disclosed embodiment provides a tightly coupled high flow capacity booster arrangement that is slidably coupled to the actuator to substantially reduce vibration-related failures.

That is, the arrangement described above preferably attaches the booster to the actuator such that the booster outlet connection can be "on axis" with the large diameter tubing and actuator port connecting the booster to either an upper or lower actuator ports. It should be appreciated that such a connection both minimizes the overall length of tubing required to connect the volume boosters to the actuator and substantially eliminates tubing bends to provide close coupling of the volume booster to the actuator. This significantly reduces the overall moment of the volume booster with respect to the actuator thereby substantially reducing the effect of vibration-induced cyclic stresses on the volume booster and its corresponding tubing.

In view of the foregoing, it should be appreciated that the scope of the invention is neither limited to the specific embodiment described with reference to the figures, nor to the various alternative embodiments described herein, but rather, to any embodiment that encompasses the spirit of the invention as defined by the following claims.

What is claimed:

1. A actuator assembly, comprising:
   a fluid actuator;
   a positioner;
   a volume booster having a main inlet connection defining an inlet and a main outlet connection defining an outlet; the volume booster having a plurality of mounting surfaces in a generally rectangular arrangement about a longitudinal axis adapted to operatively couple the volume booster to the actuator, the plurality of mounting surfaces defining at least a portion of an exterior perimeter of a lower portion of the volume booster, wherein the plurality of mounting surfaces defines a cube-shaped volume on the lower portion of the volume booster, and wherein the lower portion defines the main inlet connection and the main outlet connection of the volume booster; and
   a mounting plate having a plate-shaped portion removably secured to one of the plurality of mounting surfaces of the volume booster, the mounting plate being adapted to slidably attach the volume booster to the actuator, wherein only one of the main inlet connection or the main outlet connection extends through a first one of the plurality of mounting surfaces such that no other inlet or outlet passage is disposed through the first one of the plurality of mounting surfaces, and wherein each of a second one, a third one, and a fourth one of the plurality of mounting surfaces includes at most a single inlet passage or a single outlet passage.

2. The device of claim 1, wherein the mounting plate substantially reduces a coupling moment of the volume booster to the actuator.

3. The device of claim 1, wherein a tubing guide is operatively connected to at least one of the plurality of mounting surfaces.

* * * * *

UNITED STATES PATENT AND TRADEMARK OFFICE
CERTIFICATE OF CORRECTION

PATENT NO. : 9,677,578 B2  Page 1 of 1
APPLICATION NO. : 14/031266
DATED : June 13, 2017
INVENTOR(S) : Michel K. Lovell et al.

It is certified that error appears in the above-identified patent and that said Letters Patent is hereby corrected as shown below:

In the Specification

Column 1, Line 8, "2010," should read -- 2010, now Pat. No. 8,631,826, --.

Column 3, Line 48, "bore;" should read -- bore. --.

Column 7, Line 21, "opening 85" should read -- opening 87 --.

Column 10, Line 21, "element 46." should read -- element 48. --.

Column 14, Line 19, "rings 67," should read -- rings 65, --.

Column 14, Line 42, "element 246." should read -- element 248. --.

Signed and Sealed this
Twenty-seventh Day of March, 2018

Andrei Iancu
*Director of the United States Patent and Trademark Office*